(12) United States Patent
Talreja et al.

(10) Patent No.: US 9,600,838 B2
(45) Date of Patent: *Mar. 21, 2017

(54) PROVIDING ELECTRONIC CONTENT IN ASSOCIATION WITH A REQUEST FOR PHYSICAL CONTENT

(71) Applicant: Amazon Technologies, Inc., Reno, NV (US)

(72) Inventors: Kamlesh T. Talreja, Sammamish, WA (US); Andrew J. Watts, Seattle, WA (US); Siddharth Sriram, Seattle, WA (US); Cameron S. Janes, Seattle, WA (US); James E. Stevenson, Seattle, WA (US); Jim L. Dantzler, Newcastle, WA (US)

(73) Assignee: Amazon Technologies, Inc., Seattle, WA (US)

(*) Notice: Subject to any disclaimer, the term of this patent is extended or adjusted under 35 U.S.C. 154(b) by 562 days.

This patent is subject to a terminal disclaimer.

(21) Appl. No.: 14/108,133

(22) Filed: Dec. 16, 2013

(65) Prior Publication Data

US 2014/0229309 A1     Aug. 14, 2014

Related U.S. Application Data

(63) Continuation of application No. 12/890,363, filed on Sep. 24, 2010, now Pat. No. 8,612,298.

(51) Int. Cl.
*G06Q 30/00* (2012.01)
*G06Q 30/06* (2012.01)

(52) U.S. Cl.
CPC ......... *G06Q 30/0601* (2013.01); *G06Q 30/00* (2013.01)

(58) Field of Classification Search
CPC ........................... G06Q 30/06–30/08
USPC ............................... 705/26.1–27.2
See application file for complete search history.

(56) References Cited

U.S. PATENT DOCUMENTS

| 2002/0062252 A1* | 5/2002 | Van Zoest ......... G06Q 30/0225 705/14.26 |
| 2006/0015352 A1 | 1/2006 | Wynn et al. |
| 2008/0068253 A1* | 3/2008 | Mehta ................... G06Q 10/10 342/115 |

(Continued)

OTHER PUBLICATIONS

"Amazon.com Offers 'Harry Potter and the Half-Blood Prince' for Immediate Pre-Order; the Sixth Installment in the Harry Potter Series Scheduled for Release on Jul. 16, 2005" (Business Wire, Dec. 21, 2004).*

*Primary Examiner* — Ethan D Civan
(74) *Attorney, Agent, or Firm* — Knobbe Martens Olson & Bear LLP

(57) ABSTRACT

Disclosed systems and methods provide media content through an electronic commerce server. In one implementation, a method for providing electronic content is provided. The method includes receiving an order of a user. The order of the user may comprise a request of the user for a physical copy of media content. The commerce server may determine whether to provide to the user an electronic copy of the media content based at least on the order. Further, a request to access the electronic copy of the media content is received from the user. The method further grants the user access to the electronic copy of the media content based at least on the request to access the electronic copy of the media content.

20 Claims, 8 Drawing Sheets

(56) References Cited

U.S. PATENT DOCUMENTS

2009/0182566 A1   7/2009   Bhogal et al.

* cited by examiner

450

| Content | Content ID | Duration | Expiration | Release Date |
|---|---|---|---|---|
| Blu-ray 1 | 1476 | N/A | N/A | Available |
| Blu-ray 2 | 1477 | 24:00 | 16:22 | Available |
| Blu-ray 3 | 1478 | N/A | N/A | Memorial Day |
| The Making of Blu-ray 3 | 1479 | 24:00 | Jul. 5, 12:00 A.M. | Independence Day |

FIG. 4B

PROVIDING ELECTRONIC CONTENT IN ASSOCIATION WITH A REQUEST FOR PHYSICAL CONTENT

BACKGROUND

Online entities offer a wide variety of electronic content and services to a variety of different devices, including personal computers (PCs), electronic book viewers, portable digital assistants (PDAs), mobile telephones, pocket PCs, smart phones, and set-top boxes such as televisions, digital video recorders (DVRs), and gaming consoles. These devices often access various web pages and web services, such as those associated with online stores or other providers of audio/visual content, software programs, books, or other physical content.

For example, many online stores offer audio/visual content, software programs, books, or other physical content for sale. However, since online stores are accessed via web pages and web services, physical content is typically shipped to an individual by mail. Depending on the purchaser's physical distance from the online store's warehouse, the purchaser may not receive the physical content for several days or longer. While shipping may be expedited, increased shipping costs may reduce a purchaser's interest in buying physical content from an online store. Sales of physical content for online stores suffer as a result of mailing delays and expedited mail costs.

Conventionally, a purchaser does not have access to content between the moment of purchase and arrival of the physical content by mail. This undesirable consequence is particularly pronounced when highly sought after physical content becomes available for purchase. For example, highly sought after content is typically released at the same time in a geographic region, such as, a time zone. Potential purchasers or purchasers that may have pre-ordered a copy of the highly sought after physical content may congregate at a store at the release time to be one of the first to obtain access to the physical content. Since online stores typically do not have a store front or a physical location and delivery cannot occur immediately upon the release of highly sought after content, online stores are disadvantaged by set release times for highly sought after content.

In view of the foregoing, systems and methods are needed to overcome the limitations of providing purchasers of physical content with access to the content during undesirable mailing delays and immediately upon release of the content.

BRIEF DESCRIPTION OF THE DRAWINGS

The accompanying drawings, which are incorporated in and constitute a part of this disclosure, illustrate various disclosed embodiments. In the drawings:

FIG. 4B is an example of a data table that indicates access rights for electronic copies of media content;

DETAILED DESCRIPTION

Disclosed embodiments provide access to an electronic copy of media content in association with the sale of a physical copy of the media content. For media content that is currently available (e.g., media content that has been released by a content provider for sale or access by the public), a purchaser of a physical copy of media content may receive access to an electronic copy of the media content after ordering the physical copy. The purchaser may receive access through, for example, an online account. However, in some circumstances, the sale of a physical copy of media content may be a pre-order for unavailable media content (e.g., a DVD or Blu-ray disc of a motion picture not yet released by a content provider) and, accordingly, access rights to the media content may be stored in association with the purchaser's online account so that the user will receive access to the electronic copy of the media content on or after the release date.

As an example, a user may visit an online store and order a physical copy of media content (e.g., a DVD, Blu-ray disc, CD, book, etc.). As part of that purchase transaction, the user may receive for free (or for an additional cost) access rights to an electronic copy of the media content. The access rights may allow the user to access the electronic copy for a limited time duration (e.g., a rental that expires a certain number of hours after the media content is first viewed) or, alternatively, may not have any time limit restrictions. The electronic copy of the media content may be made available following the purchase of the physical copy of the media content or, for media content that has not been released, may be made available on or after a release date. In order to access the electronic copy, the purchaser may download the electronic copy or access the electric copy via video streaming. Similarly, an online rental may be provided by allowing access rights to the electronic media content on or after the content becomes available for purchase.

Figure 1:
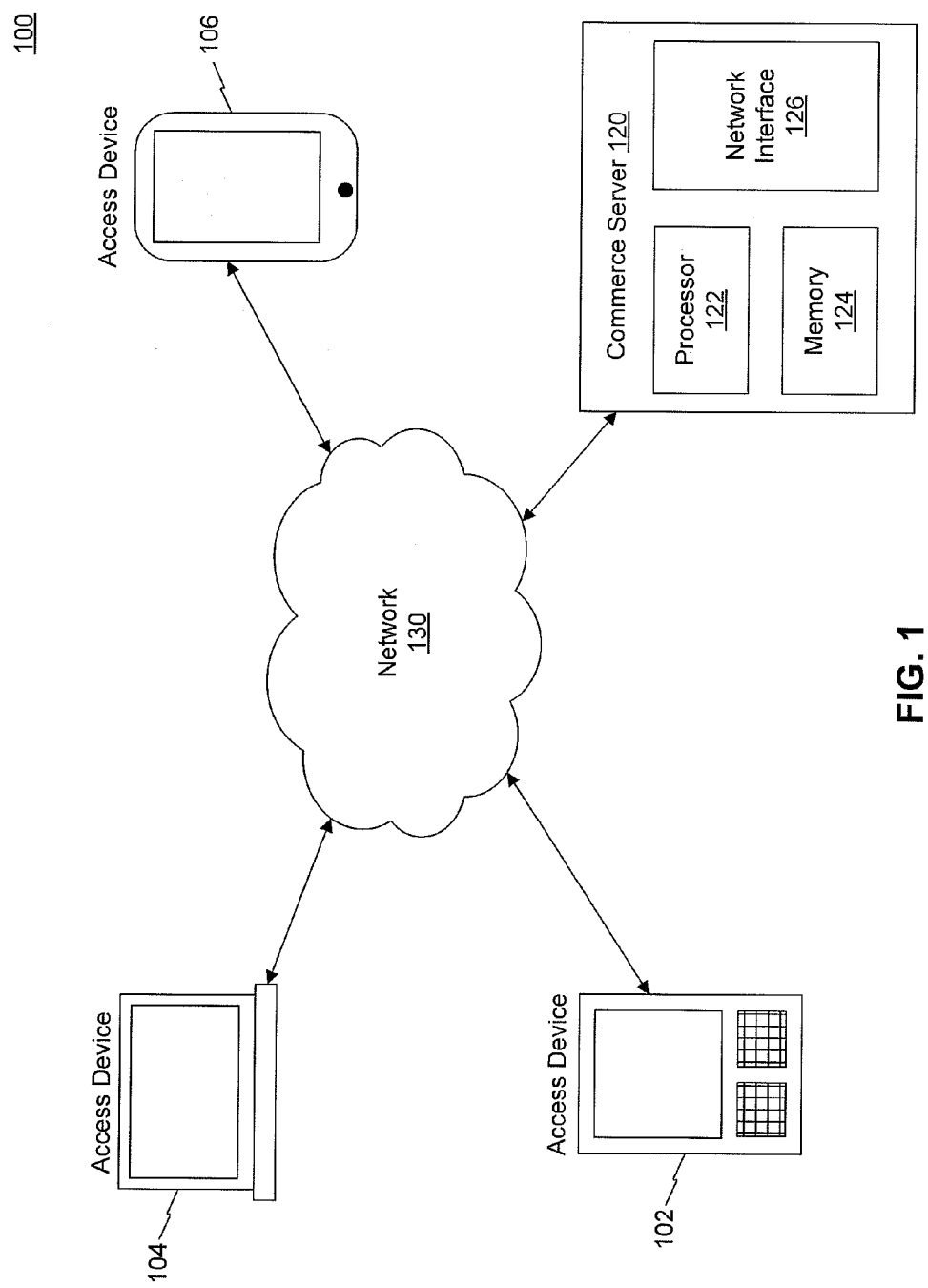
FIG. 1 is a diagram of an exemplary architecture of a system for providing electronic content.

FIG. 1 is a diagram of an exemplary architecture of a system 100 for providing electronic content, consistent with disclosed embodiments. System 100 may provide functionality that allows devices to interact with an online store provided by a server. For example, a user may purchase a physical copy of media content and, in association with the purchase, may receive access to an electronic copy of the media content.

As shown in FIG. 1, system 100 includes access devices 102, 104, and 106, and a commerce server 120, which are connected to a network 130. One of skill in the art will appreciate that a certain number of components are depicted in FIG. 1, system 100 may include any additional or alternate number of these components. Furthermore, one of ordinary skill in the art will recognize that one or more of the components of system 100 may be combined and/or divided into subcomponents.

Network 130 may represent any form or medium of digital data communication. Examples of network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet, a private network, and an intranet. For example, the Internet may include any publicly-accessible network or networks interconnected via one or more communication protocols, including, but not limited to, hypertext transfer protocol (HTTP) and transmission control protocol/internet protocol (TCP/IP). Moreover, network 130 may also include one or more mobile device networks, such as a GSM network or a PCS network, that allow mobile devices to send and receive data across network 130 via applicable communications protocols, including those described above.

Commerce server 120 may comprise a general purpose computer (e.g., a personal computer, network computer, server, or mainframe computer) having one or more processors that may be selectively activated or reconfigured by a computer program. Further, commerce server 120 may be incorporated as a node in a distributed network. For example, commerce server may communicate via network 130 with one or more additional servers (not shown), which may enable commerce server 120 to distribute processes for parallel execution by a plurality of other servers.

Commerce server 120 may include a processor 122, a memory 124, and a network interface 126 for communicating via network 130. Network interface 126 may include any communication device for sending and receiving data over network 130. Memory 124 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art.

Memory 124 may also include an applications store (not shown) and a device store (not shown). The applications store may include application programs that may be executed on commerce server 120, and that may be accessed by users of access devices 102, 104, and 106. For example, the applications store may provide online sales applications, billing verification applications, file downloading or streaming applications (e.g., an application facilitating the download of media content), applications to provide access to an electronic storage library, and any additional or alternate application program with which users may interact to buy and receive media content via network 130.

The device store may include information specific to the network connectivity and operational characteristics of one or more devices associated with network. For example, the device store may include a physical network address (e.g., a network address expressed using a networking addressing protocol of a physical network) for each device associated with network 130. Furthermore, the device store may include additional connectivity parameters associated with the devices of network 130, including, but not limited, a connection speed, authentication parameters, a connection capability of the device (e.g. an ability to connect to a 3G wireless network), or any additional or alternate parameters. Finally, the device store may also store information identifying the devices associated with network 130. For example, the device store may include identifiers associated with the devices (e.g., device names, device serial numbers, or device manufacturers), and identifiers associated with users of the devices (e.g., a user name associated with a user of access device 102).

Access devices 102, 104, and 106 may each comprise a general purpose computer, as described above. However, in additional embodiments, access devices 102, 104, and 106 may constitute a personal digital assistant (PDA), a portable navigation device, a mobile phone, a smart phone, an electronic book viewer, a set top box, a television, and any additional or alternate computing device apparent to a person of ordinary skill in the art and operable to transmit and receive data across network 130, and able to display data received from commerce server 120 across network 130. Access devices 102, 104, and 106 may also include a number of additional devices configured to transmit and receive data across network 130 including, but not limited to, set-top boxes including a television, a digital video recorder (DVR), and a gaming console. Access devices 102, 104, and 106 may include browser applications capable of rendering standard Internet content, such as Netscape Navigator, Google Chrome, Microsoft Internet Explorer, and/or Mozilla Firefox. Access devices 102, 104, and 106 may use a browser application or otherwise be configured to order media content over network 130.

In operation, commerce server 120 may facilitate the sale of a physical copy of media content. For example, the physical copy of media content may be a CD, DVD, Blu-ray disc), memory stick encoded with information, flash memory drive encoded with information, book, newspapers, magazine, or any other media content provided in a physical format. Furthermore, in connection with the sale of the physical copy, the purchaser may also receive access to an electronic copy of the media content. For example, the electronic copy of the media content may be a download of one or more files or one or more digital files that are available for streaming to a device of the purchaser.

In some circumstances, the sale of a physical copy of media content may in actuality be a pre-order for unavailable media content. For example, one may pre-order a DVD or Blu-ray disc of a motion picture prior to its release date. Accordingly, for a pre-order, commerce server 120 may provide a notification to the purchaser that the purchaser will receive access to the electronic copy of the media content on or after the release date. Furthermore, commerce server 120 may store date in association with the purchaser's account to provide access rights to the media content such that the purchaser will receive access on or after the release date.

Figure 2:
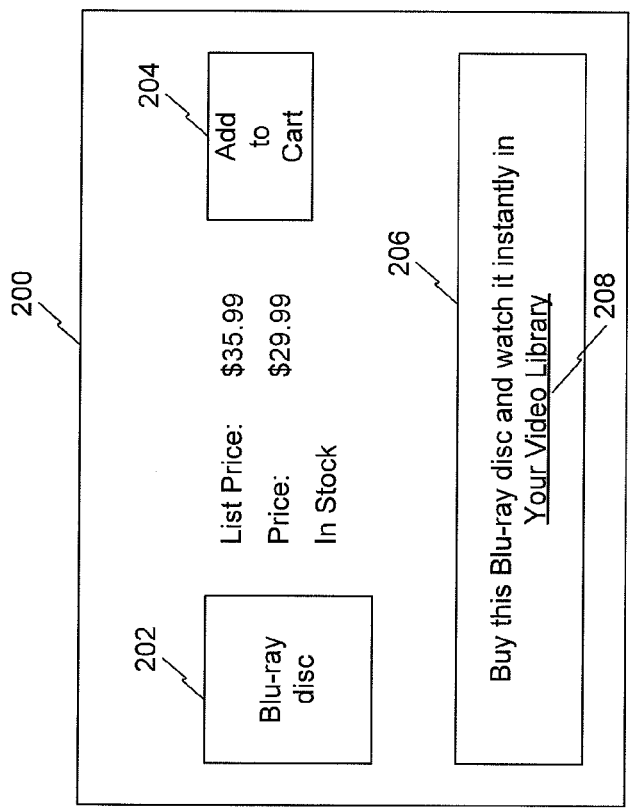
FIG. 2 is an exemplary interface for selling a physical copy of media content and providing an associated electronic copy of the media content.

FIG. 2 is an exemplary interface 200 for selling a physical copy of media content and providing an associated electronic copy of the media content, consistent with disclosed embodiments. As shown in FIG. 2, interface 200 may provide a user with an option to purchase, for example, a physical copy of media content (e.g., Blu-ray disc 202). Blu-ray disc 202 may be, for example, a disc encoded with a video copy of a motion picture. Although a Blu-ray disc is discussed in this example, a Blu-ray disc is merely exemplary and the physical copy of media content can be of a variety of formats, such as a DVD, a CD, or a book.

Interface 200 may include pricing information for the physical copy of media content, such as a sale price and a list price. Interface 200 may also provide the user with an indication of whether or not Blu-ray 202 is in stock and ready to ship. Although not shown, interface 200 may also include information describing the Blu-ray disc (e.g., a plot overview, cast list, content rating, etc.) Additionally, as shown in FIG. 2, a user may add Blu-ray 202 to an online cart by selecting an "Add to Cart" icon (i.e., element 204). Element 208 may provide a message to the user indicating that, in association with a purchase of Blu-ray disc 202, the user will receive access to an electronic copy in the user's video library. The electronic copy may become available for unlimited viewing or may be a rental that will expire after a certain time period (e.g., a twenty-four hour or forty-eight hour rental beginning after the content is first played). Additionally, as shown in FIG. 208, link 208 may provide a hypertext link to the user's video library, which is discussed in further detail below in connection with FIG. 4A.

Figure 3B:
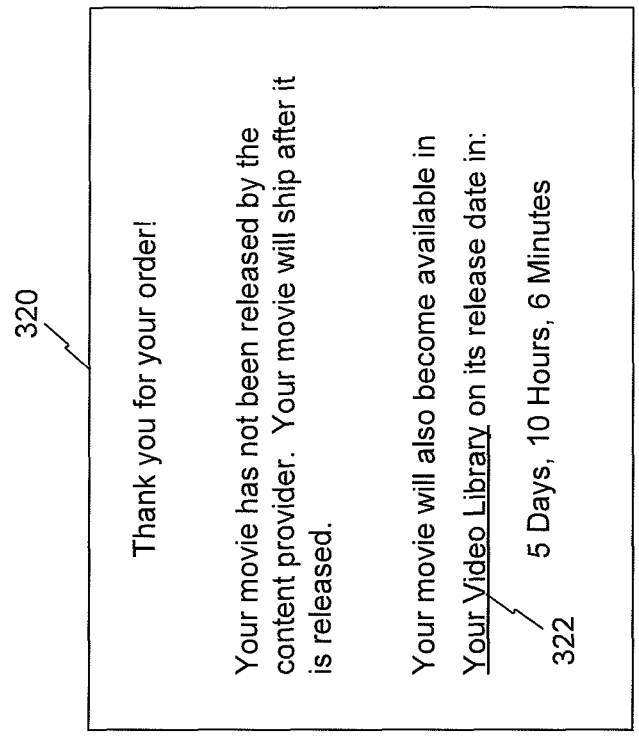
FIG. 3B is an exemplary interface for providing a confirmation of a purchase of a physical copy of media content and indicating that access to an associated electronic copy of the media content will become available on a release date.
Figure 3A:
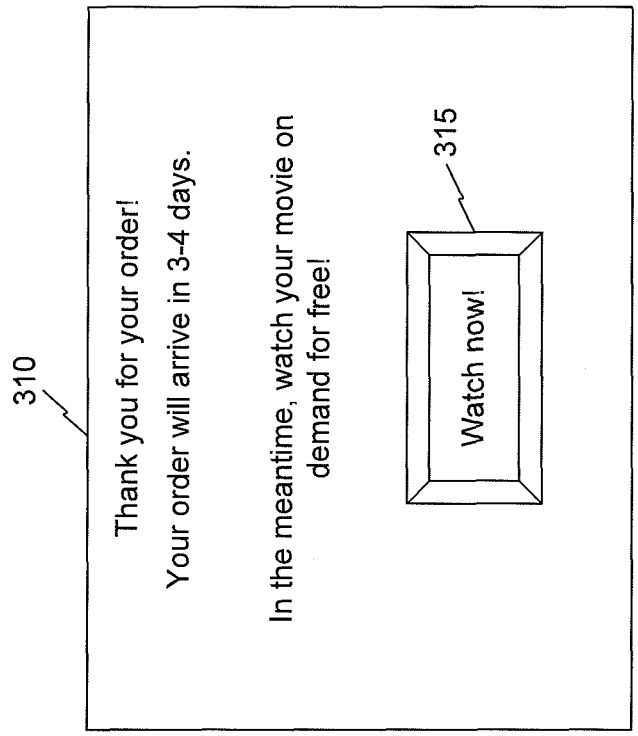
FIG. 3A is an exemplary interface for providing a confirmation of a purchase of a physical copy of media content and providing access to an associated electronic copy of the media content.

FIG. 3A is an exemplary interface 310 for providing a confirmation of a purchase of a physical copy of media content and providing access to an associated electronic copy of the media content, consistent with disclosed embodiments. For example, after placing an order for Blu-ray disc 202, the user will receive access to an electronic version of the media content on Blu-ray disc 202. To watch the media content, the user may select element 315 after placing the order.

FIG. 3B is an exemplary interface 320 for providing a confirmation of a purchase of a physical copy of media content and indicating that access to an associated electronic copy of the media content will become available on a release date, consistent with disclosed embodiments. Interface 320 may be displayed when requested media content is not yet available. For example, interface 320 may be displayed after an order is placed for unavailable media content (i.e., when placing an order via interface 200, the item may be designated as a pre-order and interface 200 may specify a release date) and may provide information to the user such as an availability status and/or an availability date. Interface 320 may also include link 322, which provides access to the user's video library.

Figure 4A:
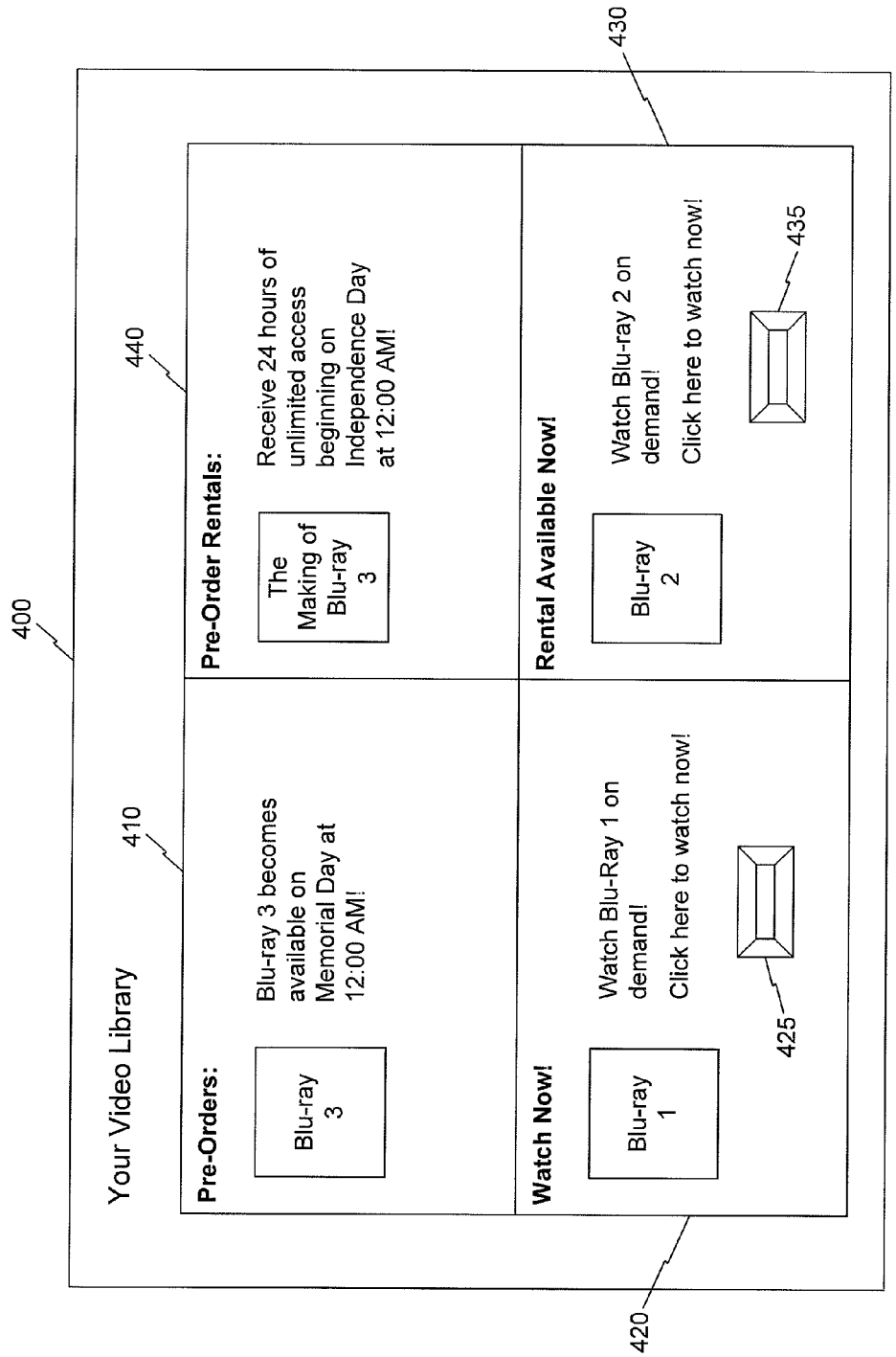
FIG. 4A is an exemplary interface for providing access to video library.

FIG. 4A is an exemplary interface 400 for providing access to a video library, consistent with disclosed embodiments. Element 410 is a section of interface 400 that provides the user a view of content that has been pre-ordered, but not yet been released by the content provider. In the example shown in element 410, the movie "Blu-ray 3" becomes available at midnight on Memorial Day." For example, the user may have placed an order for a physical copy of "Blu-ray 3" and, in association with that order, has received access to an electronic copy via the user's video library once the media content is released.

Element 420 is a section of interface 400 that provides the user with access to content that has been purchased and that is available (i.e., has been released by a content provider). In this example, the user has purchased "Blu-ray 1." Element 420 provides the user with information about "Blu-ray 1" and provides a selection button 425 that allows the user to instantly begin watching "Blu-ray 1." For example, the user may have placed an order for a physical copy of "Blu-ray 1" and, in association with that order, has received access to an electronic copy via the user's video library.

Element 430 is a section of interface 400 that provides the user a view of content that has been rented. Element 430 provides the user with information about "Blu-ray 2" and provides a selection button 435 that allows the user to instantly begin watching "Blu-ray 2," as a rental. For example, the user may have placed an order for a physical copy of "Blu-ray 2" and, in association with that order, has received access to a rental of an electronic copy via the user's video library.

Element 440 is a section of interface 400 that provides the user with a view of content that is not yet available, but that has been pre-order for rental. In the example shown in element 440, "The Making of Blu-ray 3" is available for rental for a period of 24 hours beginning on Independence Day at midnight, its release date and time. For example, the user may have placed an order for a physical copy of "The Making of Blu-ray 3" and, in association with that order, has received access to a rental of an electronic copy via the user's video library.

FIG. 4B is an example of a data table 450 for access rights of electronic copies of media content, consistent with disclosed embodiments. Data table 450 may store a user's access rights to electronic video content and is consistent with the interface 400 described above with respect to FIG. 4A. Data table 450 may specify a title of media content, a content identifier (ID), a duration that the media content is available to the user (e.g., a twenty-four hour rental or a forty-eight hour rental), an expiration of the media content (e.g., a date and/or time remaining), and a release date of the media content.

In the example shown in FIG. 4B, data table 450 indicates that the user has on demand access to the movie "Blu-ray 1" and the movie is now available for access. Furthermore, this movie is designated as being available on demand without an expiration date. Data table 450 also shows that the user has access rights to watch a rental of "Blu-ray 2" for a remaining duration of 16 hours and 22 minutes. Once the rental period expires, the user's access rights will be terminated unless the user rents "Blu-ray 2" again. As another example, data table 450 shows that "Blu-ray 3" is an on demand copy of a movie that does not expire, which has been pre-ordered but is not yet available (e.g., not available until a release date of Memorial Day). Finally, data table 450 shows that the user has a pre-order of a twenty-four hour rental of "The Making of Blu-ray 3," which is not yet available (e.g., not available until a release date of July 4).

Figure 5:
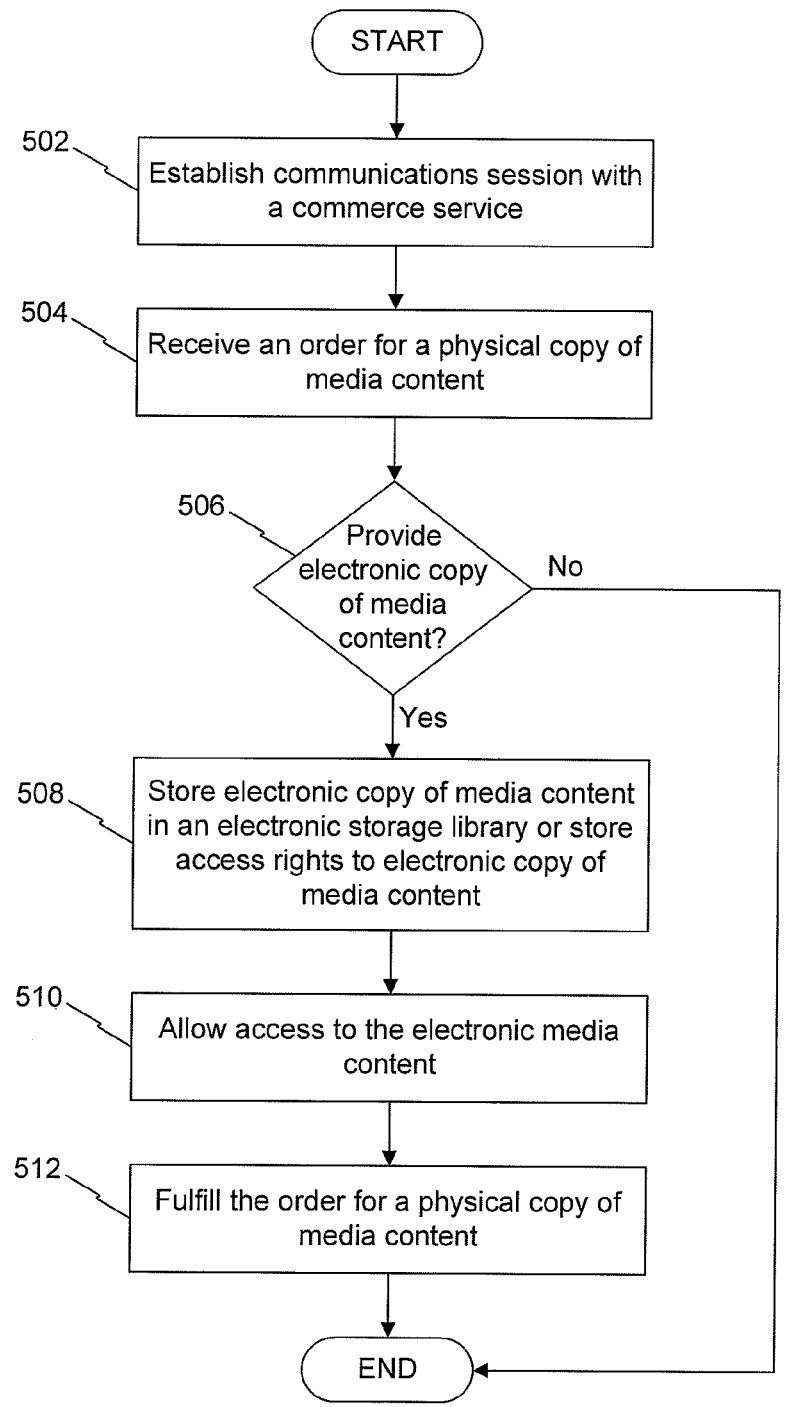
FIGS. 5 and 6 are flow diagrams of exemplary routines for providing electronic content.

FIG. 5 is a flow diagram of an exemplary routine 500 that provides electronic content, consistent with disclosed embodiments. For example, routine 500 executes a process for providing an electronic copy of media content in association with a physical copy of the media content when the media content is available.

In an alternative embodiment, the process may provide a physical copy of media content in association with an electronic copy of the media content when the media content is available (i.e., the initial order may instead be for the electronic copy). In another alternative embodiment, the process may provide a bundled physical copy of media content along with the electronic copy of the content (i.e., the initial order may be for both the electronic copy and the physical copy). In this embodiment, the physical copy of the media content and the electronic copy of the media content may be provided in a manner that is consistent with the order fulfillment methods disclosed below with respect to FIG. 5.

An example of available media content may include content that has been released by a media production entity (e.g., the media content is available on or after a release date, such as a DVD or Blu-ray release date). As described above, system 100 provides functionality that enables a user of an access device (e.g., access device 102) to interact with a commerce server (e.g., commerce server 120) over network 130. Although described in terms of a single access device, routine 500 is not limited to a specific number of devices interacting with commerce server 120.

In block 502, commerce server 120 may establish a communications session with access device 102 to provide access to a commerce service (such as an online store) over network 130. Commerce server 120 may establish the communications session with access device 102 using authentication techniques associated with any of the communications protocols outlined above, or using any additional or alternate protocol apparent to a person of skill in the art.

In some embodiments, content may be streamed to access device 102. In order to facilitate content streaming, commerce server 120 may also obtain device-specific and connection-specific information associated with access device 102 in block 502. For example, such connection-specific information may include, but is not limited to, manufacturer information, network addresses, connection speeds, and connection capabilities associated with access device 102. The device-specific and connection-specific information obtained by commerce server 120 during block 502 may be stored in a database of commerce server 120.

In block 504, commerce server 120 may receive an order for a physical copy of media content. Examples of physical media content include optical discs encoded with information (e.g., CDs, DVDs, Blu-ray discs), memory sticks encoded with information, flash memory drives encoded with information, books, newspapers, magazines, or any other media content provided in a physical format. Block 504 may further represent that a transaction has occurred and commerce server 120 has received billing information from a customer that wishes to purchase a physical copy of media content. In one non-limiting example, commerce server 120 may execute an online store application and may receive a request from access device 102 to initiate a transaction for the physical DVD copy of a motion picture. In an embodiment, the request may be transmitted from access device 102 to commerce server 120 using any of the communications protocols outlined above, or using any additional or alternate communications protocol apparent to one of skill in the art and compatible with network 130. Commerce server 120 may treat the transaction as an order for a physical copy of media content.

At block 506, commerce server 120 may determine whether or not to provide an electronic copy of the physical copy of media content. The electronic copy of the physical media content is an electronic version of the physical media content. The electronic media content may contain the same or similar content as the physical copy.

In one embodiment, commerce server 120 may determine that an electronic copy of the media content should be provided in association with the order for the physical copy of the media content. For example, as part of processing the order, commerce server 120 may receive a request from a service to provide the electronic copy of the media content. In some embodiments, a provider of commerce server 120 or a seller providing the physical copy of the media content may provide a promotion or offer in which the electronic copy of the media content is automatically provided free of charge with purchases of the physical copy of the media content. In other embodiments, the electronic copy of the media content may be provided for an additional fee.

Commerce server 120 may also transmit a message to access device 102 to determine whether or not a user wishes to obtain an electronic version of the physical copy of the media content. If an indication that a user does not wish to receive an electronic copy of the media content that corresponds to the ordered physical copy of media content (block 506—"No") is received, the order for the physical copy is fulfilled and the method ends. Although not shown, commerce server 120 may automatically deliver an electronic copy of media content to the user without receiving an indication that the user wishes to receive an electronic copy of the media content.

If, however, commerce server 120 receives an indication that a user does wish to receive an electronic copy of the media content that corresponds to the ordered physical copy of media content (block 506—"Yes"), a copy of the electronic media content may be stored in an electronic storage library, as will be discussed below with reference to block 508. In one embodiment, an electronic storage library may be implemented using any memory device or memory devices described herein such that the information stored within the electronic storage library may be accessed by both commerce server 120 and at least one of access device 102.

Electronic media content stored in the electronic storage library may include electronic versions of the physical copy of media content for which an order was received by commerce server 120 in block 504, above. Electronic copies of media content may include MP3, WAV, or other music files, computer games, computer software, television programs (or individual episodes thereof), motion pictures, video content, audio content or books (including audio books), electronic newspapers, electronic magazines, or electronic books. The electronic copies of physical media content need not be an exact copy of the physical media content. Although additional sample electronic copies of content may also be provided together with a request for a copy of physical media content, in one embodiment, the actual content of the electronic copy of media content may be an electronic version of the media content that is provided on the physical copy of media content ordered above in block 504.

At block 508, as discussed above, electronic media content corresponding to physical media content ordered in block 504 is stored in an electronic storage library. In one embodiment, an electronic storage library may comprise a digital locker, as disclosed by U.S. Pat. No. 7,627,652, entitled "Online Shared Data Environment," the content of which is incorporated by reference in its entirety. In an alternative embodiment, access to an electronic storage library may be provided for each customer accessing commerce server 120 using access device 102. In this embodiment, a customer may have a unique account that specifies which access rights to information in the electronic storage library a user may exercise. For example, commerce server 120 or a distribution server available over network 130 may provide an electronic storage library storing at least one, but possibly many, copies of electronic media content. Electronic storage libraries may be provided via distribution servers distributed by region (e.g., a distribution server provides electronic media content for a geographical area) and may supply electronic content to multiple users. The content may be streamed or downloaded to one or more users from the distribution server.

In another embodiment, an electronic storage library may be provided for each customer accessing commerce server 120 using access device 102, depending on the resources available to an online store implementing commerce server 120. For example, the electronic storage library may be populated with individual copies of media content and provided to a user on demand. In this embodiment, the electronic media content may be streamed or downloaded to a user from the electronic storage library. The user is granted individual access to an individual electronic copy of the media content.

In block 510, commerce server 120 allows access by access device 102 to the electronic media content. As discussed above, access to the electronic media content may be restricted as necessary. For example, if a received order for a physical copy of media content received in block 504 is later canceled, access to the electronic media content may be revoked. Similarly, if a physical copy of media content is returned to the online store, access to the electronic media content may be revoked. In one embodiment, access to the electronic content may be revoked by altering access to electronic media content allowed in a user's account. In another embodiment, the user's individual copy of the electronic media content may be removed from the user's electronic storage library. Thus, commerce server 120 may maintain communication with the electronic storage library in order to alter access to the electronic media content depending on whether or not an order is canceled or returned, or for other reasons.

In block 512, the order for a physical copy of media content received in block 504 is fulfilled. A fulfilled order may comprise packaging and shipping a physical copy of media content but may also comprise a condition flag set in processor 402 of commerce server 120 indicating that the order has been processed or that a copy of the electronic media content has been stored in the electronic storage library.

The sequence shown in blocks 508, 510, and 512 may be implemented differently from the sequence shown. For example, blocks 508, 510, and 512 may be performed in parallel. Furthermore, as discussed above, in other implementations, in block 504, commerce server 120 may receive an order for an electronic copy of media content. In association with the order for the electronic copy of the media content, commerce server 120 may generate an order for a physical copy of the media content, which may be shipped to the customer for free or for a nominal charge. Still further, as discussed above, the order received by commerce server 120 in block 504 may be for a bundle comprising one or more physical copies of media content and corresponding electronic copies of the media content.

Figure 6:
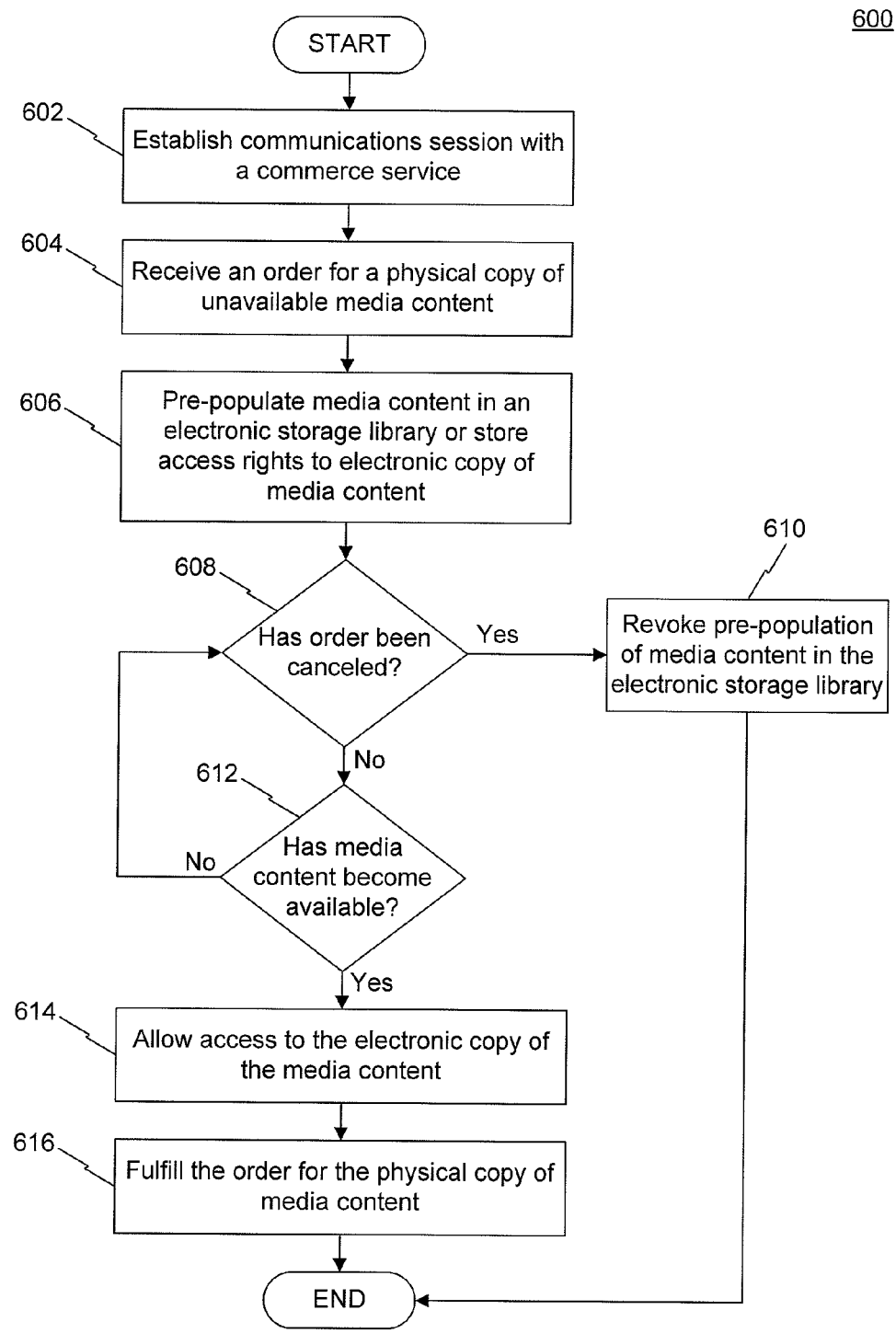

FIG. 6 is a flow diagram of an exemplary routine 600 that provides electronic content, consistent with disclosed embodiments. Routine 600 executes a process for providing an electronic copy of media content in association with a physical copy of the media content when the media content is unavailable. Although described in terms of a single access device, exemplary routine 600 is not limited to a specific number of devices interacting with commerce server 120.

In an alternative embodiment, the process may provide a physical copy of media content in association with an electronic copy of the media content when the media content is unavailable (i.e., the initial order may instead be for the electronic copy). Unavailable media content, as discussed below, includes content that has not yet been released by a media production entity (e.g., a movie that has not yet been released on DVD). In another alternative embodiment, the process may provide a bundled physical copy of media content along with the electronic copy of the content (i.e., the initial order may be a pre-order for both the electronic copy and the physical copy). In this embodiment, the physical copy of the media content and the electronic copy of the media content may be provided in a manner that is consistent with the order fulfillment methods discussed below with respect to FIG. 6 and FIG. 7.

Routine 600, discloses an embodiment in which ordered media content, physical or electronic, has not been released or has otherwise not yet been made available. Block 602 proceeds in a fashion similar to block 502 in routine 500. For example, in block 602, commerce server 120 may establish a communications session with access device 102 to provide access to a commerce service (such as an online store) over network 130.

In some embodiments, content may be streamed to access device 102. In order to facilitate content streaming, commerce server 120 may also obtain device-specific and connection-specific information associated with access device 102. For example, such connection-specific information may include, but is not limited to, manufacturer information, network IP addresses, unique device ID numbers, connection speeds, and connection capabilities associated with access device 102. Further, such device-specific information may include, but is not limited to, information identifying the devices, sizes of display screens of the devices, and resolutions of display screen of the devices. The device-specific and connection-specific information obtained by commerce server 120 during block 602 may be stored in a database of commerce server 120.

In block 604, commerce server 120 may receive an order for a physical copy of media content. Examples of physical media content include optical discs encoded with information (e.g., CDs, DVDs, Blu-rays), memory sticks encoded with information, flash memory drives encoded with information, books, newspapers, magazines, or any other media content provided in a physical format. Block 604 may further represent that a transaction has occurred and commerce server 120 has received billing information from a customer that wishes to purchase a physical copy of media content. In one non-limiting example, commerce server 120 may execute an online store application and may receive a request from access device 102 to initiate a transaction for a physical DVD copy of a motion picture. In an embodiment, the request may be transmitted from access device 102 to commerce server 120 using any of the communications protocols outlined above, or using any additional or alternate communications protocol apparent to one of skill in the art. Commerce server 120 may treat the transaction as an order for a physical copy of media content. In this embodiment, the electronic media content may be provided as a promotional tool for garnering interest in the electronic media content providing service.

Once the order and the accompanying transaction for physical content is completed in block 604, an electronic copy of the physical content is pre-populated into an electronic storage library in block 606. While not shown as an optional block, an online store may provide a customer with an opportunity to provide an indication whether or not a user wishes to receive an electronic copy of the physical copy of media content. Much like block 506 in routine 500, commerce server 120 may transmit a message to access device 102 to determine whether or not a user wishes to obtain an electronic version of the media content. If an indication that user does not wish to receive an electronic copy of the media content that corresponds to the ordered physical copy of the media content is received, the physical copy of media content is fulfilled, as described above. If, however, commerce server 120 receives an indication that a user does wish to receive an electronic copy of the media content that corresponds to the ordered physical copy of media content, a copy of the electronic media content will be pre-populated in an electronic storage library. Alternatively, while not shown, commerce server 120 may automatically provide an electronic copy of media content to the user without receiving an indication that the user wishes to receive an electronic copy of the media content, as discussed above.

Pre-populating electronic media content in an electronic storage library may be accomplished in a variety of ways. In one embodiment, a customer may have a unique account that specifies which access rights to information in the electronic storage library a user may exercise. For example, an electronic storage library may store at least one, but possibly many, copies of electronic media content. As discussed above, the electronic storage library may be provided via commerce server 120 or via a distribution server available over network 130. For example, distribution servers may be distributed by region. In this embodiment, the content may be streamed or downloaded to a user from the distribution server. Furthermore, in this embodiment, access to the electronic media content may be restricted until a release date for the media content. When the media content becomes available, access may be provided to the user by streaming or by download.

In another embodiment, some customers may be provided an individual electronic storage library containing electronic media content. For example, the electronic storage library may be populated with individual copies of media content and provided to a user on demand. In this embodiment, the content may be streamed or downloaded to a user from the electronic storage library. Accordingly, the user is granted individual access to an individual electronic copy of the media content. In this embodiment, while the electronic content may be pre-populated in the user's electronic storage library, access to the electronic media content may be limited until the release date. For example, a gray icon may appear in the user's view of a graphical representation of the contents of the electronic storage library denoting that the electronic media content has not yet been released and is unavailable. Optionally, a countdown to availability may also be provided.

Since different customers may live in different time zones, the release time and date established by production entities may be established independently for each time zone. Release of the electronic media content, or the access rights, may be based on the current time in the time zone to which the physical copy was shipped (e.g., based on a shipping address or billing address associated with the order). Alternatively, the geographic location of the IP address, or other device identifier described above, for access device 102 may indicate the moment when the release time and date has arrived. Pre-population of content into the electronic storage library may or may not be made known to a user, although an indication that content will be available as of the release date may be sent. Messages indicating that content has become available may also be sent to access device 102 or by conventional messaging techniques such as email, text message, instant message, or other real-time updates.

Pre-populating electronic media content into an electronic storage library allows, for example, an online store to overcome bandwidth support problems that may be encountered. Many media content production entities set release dates for specific media content both as a form of advertising and to increase prospective sales by heightening the anticipation of the public for the content. In some embodiments, access rights to the content may be sold before the media content itself is available. Due to inconsistent timing and unpredictable times and dates for shipping, physical copies of media content typically cannot usually be shipped prior to the release date set by a media content production entity without contractual risk. Thus, providing access rights or electronic copies of pre-ordered physical copies of media content that mature at the content is released by production entities allows online stores to overcome the problems some online stores experience in mailing delays.

Electronic media content stored in the electronic storage library may include electronic versions of the physical copy of media content for which an order was received by commerce server 120 in block 504, above. Electronic copies of media content may include MP3, WAV, or other music files, computer games, computer software, television programs (or individual episodes thereof), motion pictures, video content, audio content or books (including audio books), electronic newspapers, electronic magazines, or electronic books. The electronic copies of physical media content need not be exact copies of the physical media content. For example, the media content may be a video and the physical copy and the electronic copy may conform to a different specification (e.g., standard definition or high definition resolutions). Although additional sample electronic copies of content may also be provided together with a request for a copy of physical media content, in one embodiment, the actual content of the electronic copy of media content may be an electronic version of the media content on the physical copy of media content ordered above in block 504.

Continuing with block 606, electronic media content corresponding to physical media content ordered in block 504 is pre-populated in an electronic storage library. In one embodiment, an electronic storage library may comprise a digital locker, as discussed above. In another embodiment, an electronic storage library may be provided for each customer accessing commerce server 120 using access device 102.

In an alternative embodiment, access to an electronic storage library may be provided for each customer accessing commerce server 120 using access device 102. In this embodiment, a customer may have a unique account that specifies which access rights to information in the electronic storage library a user may exercise. For example, an electronic storage library may comprise at least one, but possibly many, copies of electronic media content, each pre-populated in the electronic storage library. Electronic storage libraries may be organized according to regions, as discussed above. In this embodiment, the content may be streamed or downloaded to a user from the distribution server.

In another embodiment, an electronic storage library may be provided for each customer accessing commerce server 120 using access device 102. For example, the electronic storage library may be populated with individual copies of media content and provided to a user on demand. In this embodiment, the content may be streamed or downloaded to a user from the electronic storage library. The user is granted individual access to a pre-populated individual electronic copy of the media content.

In one embodiment, and subject to access restrictions that will be discussed below, pre-populated electronic media content stored in the electronic storage library may be downloaded by a user for use on access device 102 when or after it becomes available. In an alternative embodiment, the pre-populated electronic media content in the electronic storage library may also be streamed from the electronic storage library to access device 102 when or after it becomes available.

In block 608, commerce server 120 may monitor the status of the orders up until the release date (e.g., a date and/or time) on which content becomes available. In this embodiment, commerce server 120 may allow access by access device 102 to the electronic media content in the electronic storage library. As discussed above, access to the electronic media content in the electronic storage library may be restricted as necessary. For example, if a received order for a physical copy of media content received in block 604 is later canceled, access to the electronic media content in the electronic storage library is revoked at block 610. If prospective access to the pre-populated electronic media content is revoked, routine 600 ends. Similarly, if a physical copy of media content is later returned to the online store through the mail, access to the electronic media content in the electronic storage library may be revoked in a manner similar to that disclosed above with respect to block 510. Thus, commerce server 120 maintains communication with the electronic storage library in order to manipulate access to the electronic media content depending on whether or not an order is canceled or revoked, or for other reasons.

If commerce server 120 determines that the order has not been canceled, commerce server 120 next determines whether or not the media content has become available at block 612. If the media content is not yet available (block 612—"No"), commerce server 120 will return to block 608 and repeat the block. Block 608 need not be repeated continuously, although it may be repeated as often as desired. Block 608 may be performed independently by commerce server 120, such as prior to the release of popular media content to ensure that access to electronic content is not provided for cancelled orders. When it is determined that the timing conditions for release of media content have been satisfied (block 612—"Yes"), routine 600 continues to block 614.

At block 614, commerce server 120 may allow access by access device 102 to the electronic media content in the electronic storage library. As discussed above, access to the electronic media content in the electronic storage library may be revoked as necessary even after access has been granted in block 614. For example, if a received order for a physical copy of media content received in block 504 is later canceled, access to the electronic media content in the electronic storage library may be revoked. Similarly, if a physical copy of media content is later returned to the online store, access to the electronic media content in the electronic storage library may be revoked. Thus, commerce server 120 maintains communication with the electronic storage library in order to manipulate access to the electronic media content depending on whether or not an order is canceled or revoked, or for other reasons.

In block 616, the order for a physical copy of media content received in block 604 is fulfilled. A fulfilled order may comprise packaging and shipping a physical copy of media content but may also be a condition flag set in processor 402 of commerce server 120 indicating that the order has been processed or that a copy of the electronic media content has been stored in the electronic storage library. Further, a fulfilled order may comprise merely manipulating access rights for access device 102 to electronic media content that is stored in the electronic storage library. Method 600 ends after order fulfillment. While not shown in blocks 614 and 616, access to the pre-populated media content may be revoked after the media content is pre-populated to the electronic storage library. For example, if the order is canceled or the physical copy of media content is later returned, access to the pre-populated media content may be revoked.

The sequence shown in blocks 614 and 616 may be implemented differently from the sequence shown. For example, blocks 614 and 616 may be performed in parallel. Also, as discussed above, and similar to the discussion above regarding FIG. 5, in other implementations, in block 604, commerce server 120 may receive an order for an electronic copy of media content. In association with the order for the electronic copy of the media content, commerce server 120 may generate an order for a physical copy of the media content, which may be shipped to the customer for free or for a nominal charge. In an embodiment in which the physical copy of the media content and the electronic copy of media content are bundled, commerce server 120 may generate an order for a physical copy of the media content for shipping and provide access rights to the electronic copy of media content. The status of the access rights may depend on the availability of the media content at the time of the order, as discussed above.

In another embodiment, the media content may be a television series. The delay between the end of a season of television series and the release date for the physical copy of media content may be a significant amount of time. In this embodiment, electronic copies of the media content are provided following the airing of each episode of the television series for a fee. The fee may be amortized over the television season such that the price a user pays for each episode of the television series is equal to the cost of the physical copy of the television series content when available. The physical copy of the media content may be automatically shipped when it becomes available. Likewise, physical copies of each episode may be automatically shipped at release in the case a user does not purchase the entire series.

In another embodiment, commerce server 120 may consider a user's past buying history and provide an electronic copy of previously purchased physical content. The user may be informed that the electronic content corresponding to the previously ordered physical content is available by streaming or downloading, as discussed above, using the electronic storage library.

In another embodiment, as discussed above, commerce server 120 may transmit a message notifying a user that content has become available. In this embodiment, the message itself may be pre-populated in an electronic storage library for delivery to a user device at the time the content becomes available. In this manner, a user of access device 102 may be notified in real time that content has become available. This embodiment allows simultaneous notification of each user or device accessing commerce server 120. Since sending messages to each user or device accessing commerce server 120 indicating that new content has become available may take hours (and therefore fail to notify a user or device that the content at the time the content becomes available), pre-populating the message in the electronic storage library or sending the message to a user device in advance allows commerce server 120 to provide a message prior to media content availability. Commerce server 120 may coordinate delivery of the message to be approximately simultaneous.

As one of ordinary skill in the art will appreciate, one or more of blocks 502-512 and 602-616 may be optional and may be omitted from implementations in certain embodiments. Furthermore, functionality provided by one or more of blocks 502-512 and 602-616 may be subdivided into multiple blocks.

Figure 7:
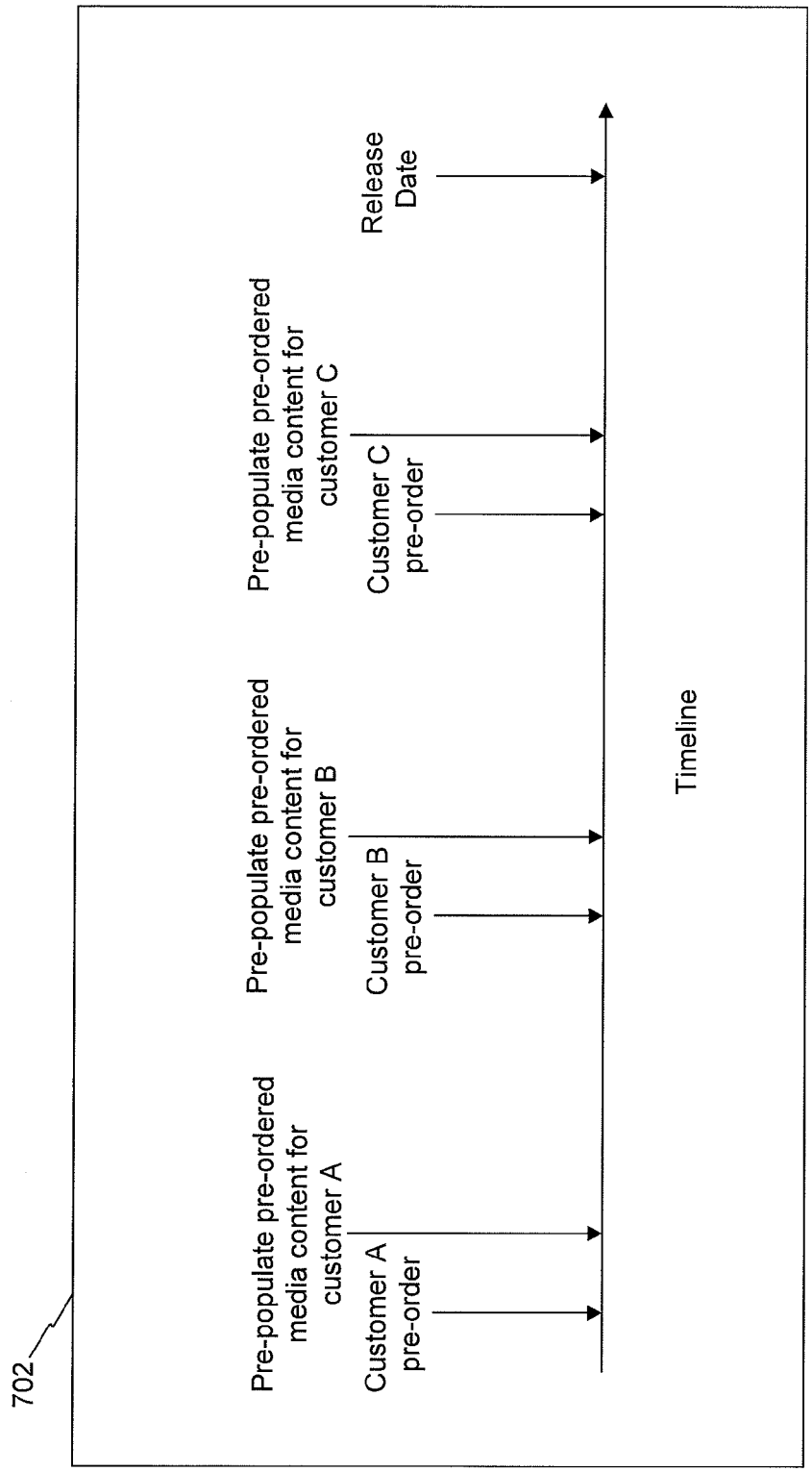
FIG. 7 is an exemplary timeline for pre-populating content in an electronic storage library.

FIG. 7 shows a an exemplary timeline for pre-populating media content in an electronic storage library, as described above with respect to FIG. 6. Timeline 702 shows customers A, B, and C that each pre-order media content with a specific release date. However, customers A, B, and C, each pre-order the media content at different times prior to the release date of the media content. Accordingly, each of the orders of customers A, B, and C, are considered a pre-order, as shown in timeline 702.

At the time that the pre-orders are received for each of customers A, B, and C, or sometime thereafter, the media content is pre-populated into an electronic storage library that may be accessed by each of customers A, B, and C. Each customer may have access to an individual electronic storage library, or may merely have access to an electronic storage library containing specific media content. The timing of the pre-population of the media content after the pre-order may be different for each of customers A, B, and C but, the media content may be pre-populated prior to the release date.

Once the release date arrives, as shown in timeline 702, access to the pre-ordered and pre-populated media content is granted to each of customers A, B, and C. While timeline 702 shows the release date and allowing access to pre-populated content occurs at different times, access may be granted simultaneously with the arrival of the release date. Access may be controlled by a condition flag in the commerce server that changes when the release date arrives.

One of ordinary skill in the art will recognize that many more customers than customers A, B, and C may pre-order content. Thus, the scale of the timeline may include millions of customers, or more. However, regardless of the number of customers, pre-population of pre-ordered media content may occur after the media content is pre-ordered and before the release date. Thus, delays in providing the media content to the user will be reduced or eliminated because the media content will already be stored in a user accessible location. The release date and the accompanying re-setting of the access control flag may determine when the user may begin to view the electronic media content.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other high-definition optical storage media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C#, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

What is claimed is:

1. A system comprising:
   a computer-readable data store storing computer-executable instructions; and
   a computing device in communication with the computer-readable data store, the computing device configured by the computer-executable instructions to at least:
   receive an indication that a user has purchased a physical copy of media content;
   grant, based at least partly on the physical copy having been purchased by the user, access rights to the user for an electronic copy of the media content;
   determine if the electronic copy of the media content is available or unavailable;
   if the electronic copy of the media content is determined to be unavailable,
      determine a future time at which the user will receive access to the electronic copy,
      set the access rights granted the user to indicate the future time at which the user will receive access to the electronic copy, and
   if the electronic copy of the media content is determined to be available, set the access rights granted the user to indicate that the user currently has access to the electronic copy.

2. The system of claim 1, wherein the computing device is further configured by the computer-executable instructions to at least store the access rights of the user in an electronic storage library of the user.

3. The system of claim 1, wherein the media content comprises at least one of a motion picture, a television program, a collection of television programs, a song, a collection of songs, computer software, a game or a book.

4. The system of claim 1, wherein the physical copy of the media content comprises at least one of an optical disc, a memory stick, a flash drive, or a physical book.

5. The system of claim 1, wherein the electronic copy of the media content comprises a computer-readable file of the media content.

6. The system of claim 1, wherein the electronic copy of the media content is stored in a digital library associated with an account of the user.

7. The system of claim 1, wherein the electronic copy of the media content is stored in a storage repository accessible by the computing device.

8. The system of claim 1, wherein the electronic copy of the media content is stored at a third-party service.

9. The system of claim 1, wherein the computing device is further configured by the computer-executable instructions to at least provide, to the user, access to the electronic copy of the media content by downloading or streaming the electronic copy of the media content to a user device.

10. A non-transitory computer-readable medium storing computer executable instructions that, when executed by one or more computer systems, configure the one or more computer systems to perform operations comprising:
    receiving an indication that a user has purchased a physical copy of media content;

granting, based at least partly on the physical copy having been purchased by the user, access rights to the user for an electronic copy of the media content;

determining if the electronic copy of the media content is available or unavailable;

if the electronic copy of the media content is determined to be unavailable, determining a future time at which the user will receive access to the electronic copy, setting the access rights granted the user to indicate the future time at which the user will receive access to the electronic copy, and if the electronic copy of the media content is determined to be available, setting the access rights granted the user to indicate that the user currently has access to the electronic copy.

11. The non-transitory computer-readable medium of claim 10, the operations further comprising storing the access rights in an electronic storage library of the user.

12. The non-transitory computer-readable medium of claim 10 wherein the media content comprises at least one of a motion picture, a television program, a collection of television programs, a song, a collection of songs, computer software, a game or a book.

13. The non-transitory computer-readable medium of claim 10, wherein the physical copy of the media content comprises an optical disc, a memory stick, a flash drive, or a physical book.

14. The non-transitory computer-readable medium of claim 10, wherein the electronic copy of the media content comprises an electronic version of the physical copy of the media content.

15. The non-transitory computer-readable medium of claim 10, wherein the electronic copy of the media content is stored in a digital library associated with an account of the user.

16. The non-transitory computer-readable medium of claim 10, wherein the electronic copy of the media content is stored in a storage repository accessible by the one or more computing systems.

17. The non-transitory computer-readable medium of claim 10, wherein the electronic copy of the media content is stored at a third-party service.

18. The non-transitory computer-readable medium of claim 10, the operations further comprising providing, to the user, access to the electronic copy of the media content by downloading or streaming the electronic copy of the media content to a user device.

19. A computer-implemented method for providing electronic content, the computer-implemented method comprising:

receiving, by a commerce server, an order of a user, the order comprising a request of the user to purchase a physical product;

determining, by the commerce server, whether to provide to the user digital content related to the physical product based at least on the physical product having been purchased by the user;

in response to determining to provide to the user the digital content related to the physical product, automatically authorizing the user to access the digital content related to the physical product;

receiving, from the user, a request to access the digital content related to the physical product; and providing, to the user, access to the digital content related to the physical product, based at least on the request to access the digital content related to the physical product and the automatic authorization of the user.

20. The computer-implemented method of claim 19, wherein once provided to the user, the digital content related to the physical product is stored in at least one of a user computing device associated with the user or in a remote storage associated with an account of the user.

\* \* \* \* \*